(12) United States Patent
Maillet et al.

(10) Patent No.: US 11,296,626 B2
(45) Date of Patent: Apr. 5, 2022

(54) MOTOR CONTROL SYSTEM

(71) Applicants: STMicroelectronics (Grenoble 2) SAS, Grenoble (FR); STMicroelectronics (Rousset) SAS, Rousset (FR)

(72) Inventors: Gwenael Maillet, Grenoble (FR); Jean-Louis Labyre, Sassenage (FR); Gilles Bas, Beauvoisin (FR)

(73) Assignees: STMicroelectronics (Grenoble 2) SAS, Grenoble (FR); STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 16/921,557

(22) Filed: Jul. 6, 2020

(65) Prior Publication Data

US 2020/0336091 A1 Oct. 22, 2020

Related U.S. Application Data

(63) Continuation of application No. 16/281,604, filed on Feb. 21, 2019, now Pat. No. 10,742,145.

(30) Foreign Application Priority Data

Feb. 27, 2018 (FR) ...................................... 1851734

(51) Int. Cl.
*H02M 1/44* (2007.01)
*H02P 7/29* (2016.01)
(Continued)

(52) U.S. Cl.
CPC .............. *H02P 7/29* (2013.01); *G05B 19/042* (2013.01); *G06K 19/00* (2013.01);
(Continued)

(58) Field of Classification Search
CPC .... H02M 1/44; H02P 7/29; H02P 7/05; G05B 19/042; G05B 2219/25257; G06K 19/00; G06K 19/0723
See application file for complete search history.

(56) References Cited

U.S. PATENT DOCUMENTS 4,334,221 A 6/1982 Rosenhagen et al.
7,135,827 B1 * 11/2006 Lampson ............... H02M 7/003
318/135
(Continued)

FOREIGN PATENT DOCUMENTS

FR 2992081 A1 12/2013
JP 2012134721 A 7/2012

OTHER PUBLICATIONS

Chowdhury et al. "A Solution to Speeding Related Problem in Road Vehicles Using Passive RFID Tags"; 2014 International Conference on Control, Instrumentation, Energy & Communication(CIEC); IEEE, (Jan. 31, 2014), pp. 96-100 (Year: 2014).*
(Continued)

*Primary Examiner* — Cortez M Cook
(74) *Attorney, Agent, or Firm* — Crowe & Dunlevy

(57) ABSTRACT

Control over the operation of an electrically-controlled motor is supported by an interface circuit between the electrically-controlled motor and a near-field radio frequency communication controller. The interface circuit includes a first circuit that receives at least one control set point through a near-field radio frequency communication issued by the near-field radio frequency communication controller. A second circuit of the interface generates one or more electric signals in pulse width modulation based on the control set point.

59 Claims, 7 Drawing Sheets

(51) Int. Cl.
*G05B 19/042* (2006.01)
*G06K 19/07* (2006.01)
*G06K 19/00* (2006.01)
*H02P 7/03* (2016.01)

(52) U.S. Cl.
CPC ............ *G06K 19/0723* (2013.01); *H02P 7/05* (2016.02); *G05B 2219/25257* (2013.01)

(56) References Cited

U.S. PATENT DOCUMENTS

| | | | |
|---|---|---|---|
| 9,667,122 | B1 | 5/2017 | Huang et al. |
| 2009/0088077 | A1 | 4/2009 | Brown et al. |
| 2009/0109003 | A1 | 4/2009 | Tucker et al. |
| 2009/0174592 | A1 | 7/2009 | Muellner |
| 2009/0251289 | A1 | 10/2009 | Amtmann |
| 2010/0171598 | A1 | 7/2010 | Mehring |
| 2011/0084807 | A1 | 4/2011 | Logan et al. |
| 2011/0148594 | A1 | 6/2011 | Kang |
| 2011/0248834 | A1 | 10/2011 | Warner et al. |
| 2011/0273271 | A1 | 11/2011 | Alicot |
| 2013/0015798 | A1 | 1/2013 | Wright |
| 2014/0086301 | A1 | 3/2014 | Akhavan et al. |
| 2014/0097774 | A1* | 4/2014 | Li ................. H02P 6/182 318/400.06 |
| 2014/0249825 | A1 | 9/2014 | Proud |
| 2015/0303992 | A1 | 10/2015 | Kim et al. |
| 2016/0019404 | A1 | 1/2016 | Powell |
| 2017/0015207 | A1* | 1/2017 | Houda .................. H02M 1/44 |
| 2017/0017814 | A1 | 1/2017 | Roberts |
| 2018/0041201 | A1 | 2/2018 | Tang et al. |

OTHER PUBLICATIONS

Stmicroelectronics, ST25DV02K-W1 ST25DV02K-W2: "Dynamic NFC/RFID Tag IC with 2-Kbit EEPROM with up to 2x pulse width modulation outputs,",https://www.st.com/resource/en/data_brief/st25dv02k-w1.pdf, Feb. 2018, 3 pages.

Chowdhury Anirban et al: "A solution to speeding related problem in road vehicles using passive RFID tags", Proceedings of the 2014 International Conference on Control, Instrumentation, Energy and Communication (CIEC), IEEE, Jan. 31, 2014 (Jan. 31, 2014), pp. 96-100, XP032684288, DOI: 10.1109/CIEC.2014.6959057 [extrait le Nov. 14, 2014] * le document en entier *.

Vania et al: "Smart dog feeder design using Wireless communication, MQTT and Android client" 2016 International Conference on Computer, Control, Informatics and Its Applications (IC3INA), IEEE, Oct. 3, 2016 (Oct. 3, 2016), pp. 191-196, XP033069340, DOI: 10.1109/IC3INA.2016.7863048 [extrait le Feb. 23, 2017] * le document en entier*.

INPI Search Report and Written Opinion for FR 1851734 dated Nov. 20, 2018 (10 pages).

* cited by examiner

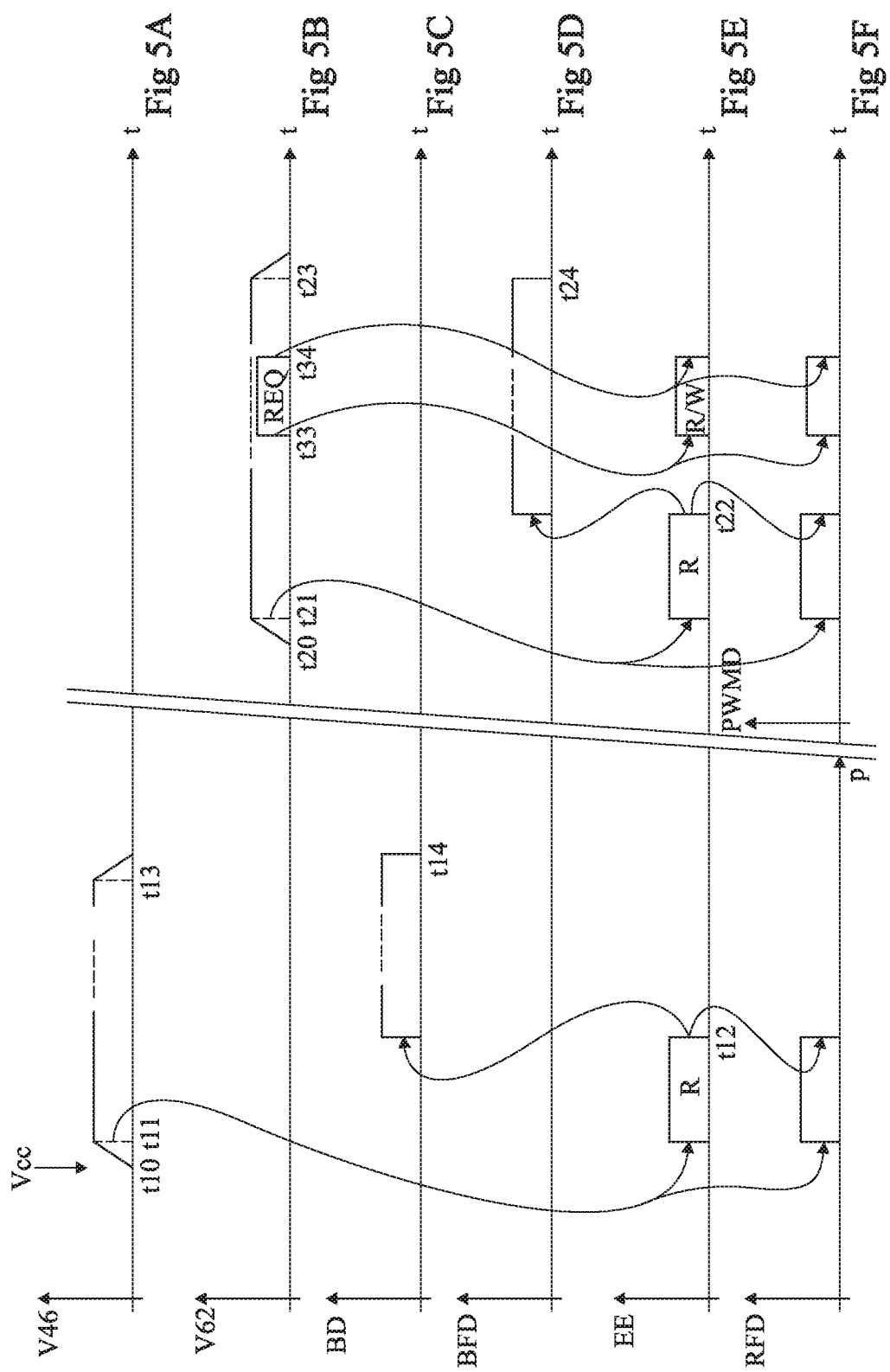

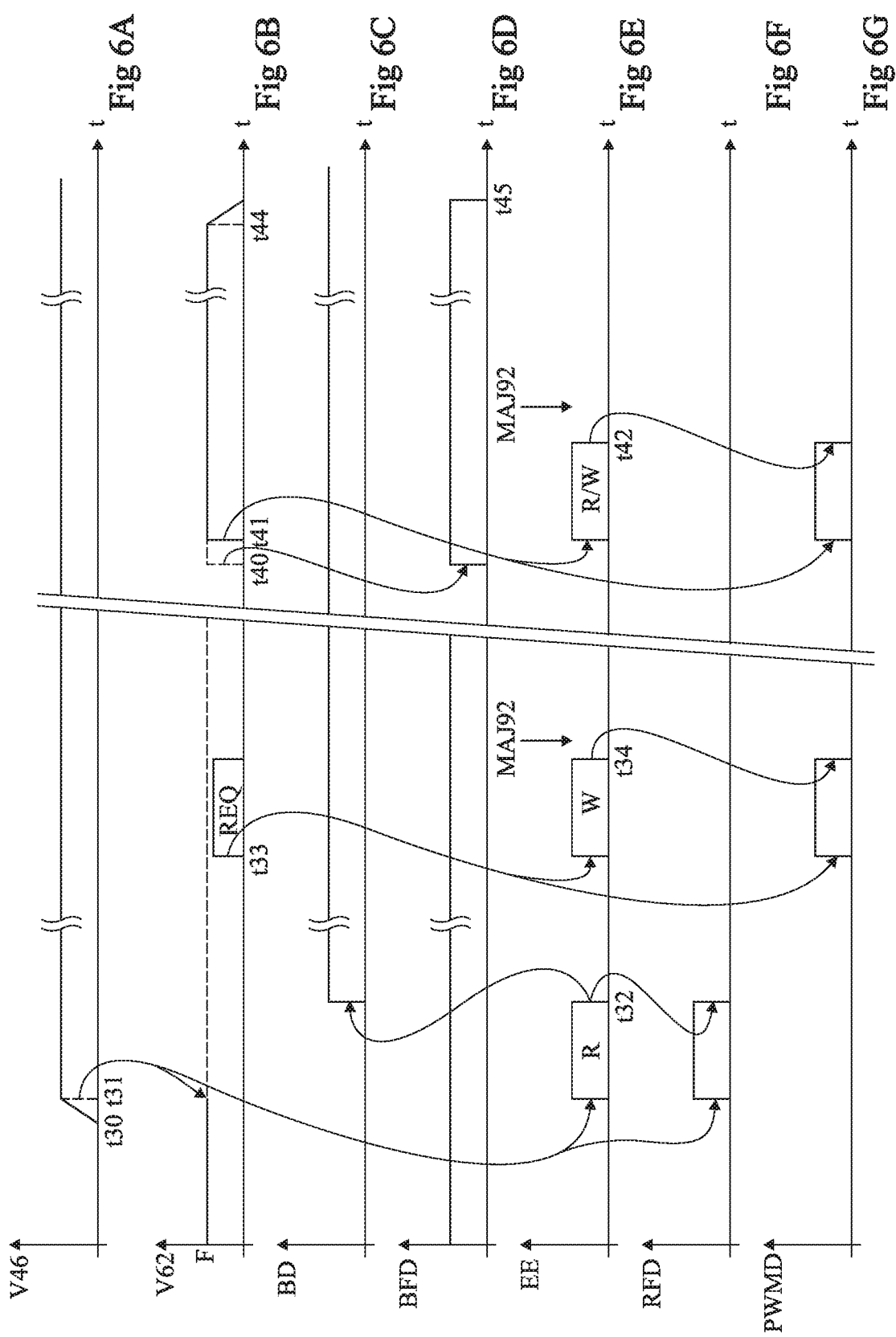

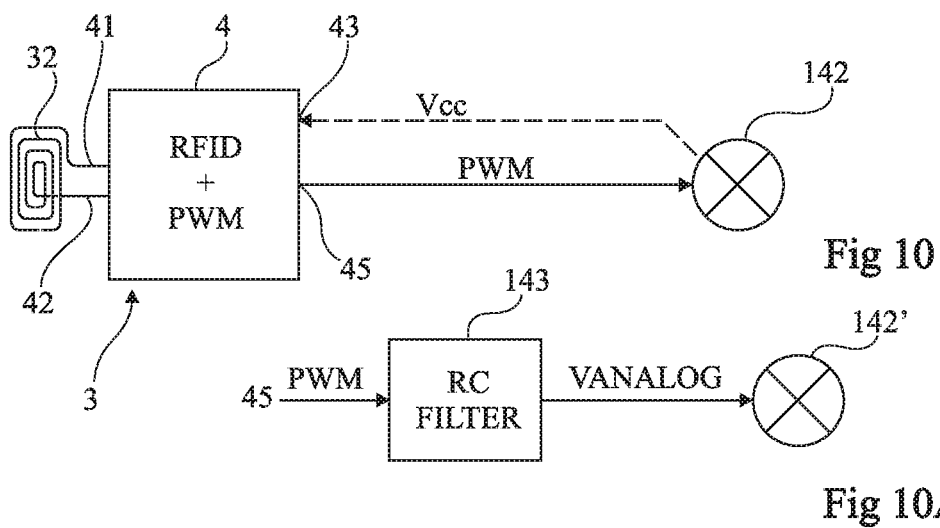
Fig 10
Fig 10A
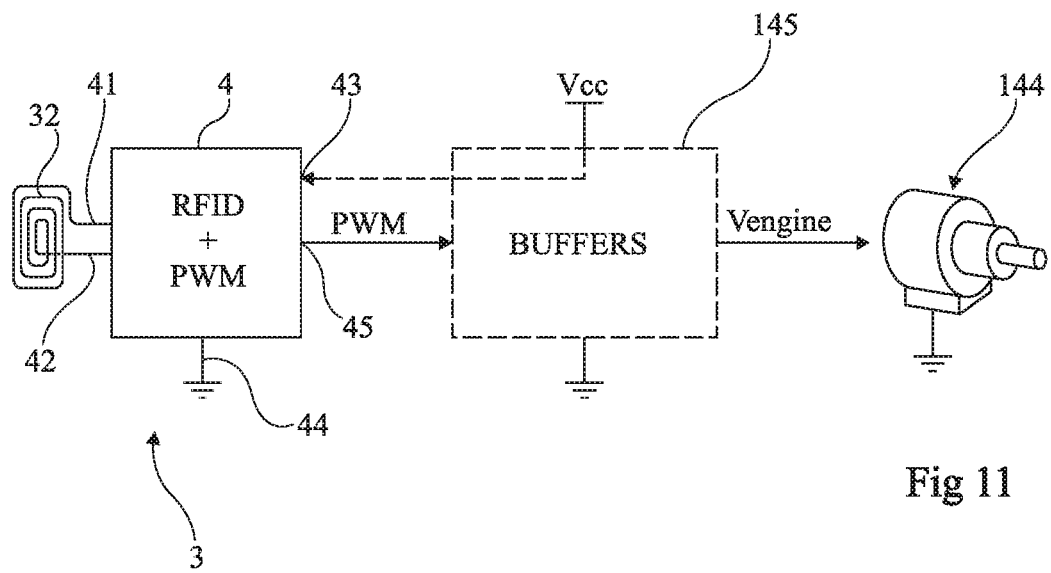
Fig 11

MOTOR CONTROL SYSTEM

CROSS REFERENCE TO RELATED APPLICATIONS

This application is a continuation of U.S. patent application Ser. No. 16/281,604 filed Feb. 21, 2019, which claims the priority benefit of French Application for Patent Number 1851734, filed on Feb. 27, 2018, the contents of which are hereby incorporated by reference in their entireties to the maximum extent allowable by law.

TECHNICAL FIELD

The present disclosure generally relates to electronic circuits and, more specifically, to electromagnetic transponders or electronic tags using the RFID (Radio Frequency Identification) technology. The present disclosure more particularly applies to the control of equipment from an electronic tag.

BACKGROUND

Communication systems comprising electromagnetic transponders are more and more frequent, particularly since the development of near-field communication technologies, equipping, in particular, cell phones.

Such systems use a radio frequency electromagnetic field emitted by a device (terminal or reader) to communicate with another device (card or tag). A NFC device comprises a resonant circuit formed of one or a plurality of antennas (inductive elements) and of one or a plurality of capacitive elements for detecting an electromagnetic field. The voltage recovered across the resonant circuit is processed by electronic circuits of the device or transponder to extract the power necessary to its operation, decode data transmitted via a modulation of the electromagnetic field, transmit data in retromodulation, etc.

In applications targeted by the present disclosure, an electronic tag is intended to detect control or configuration data intended for equipment having this tag coupled thereto. Such data should thus be converted into signals interpretable by the equipment (the application) to be controlled.

SUMMARY

An embodiment overcomes all or part of the disadvantages of known techniques for controlling equipment based on data received by near-field communication.

An embodiment provides a solution more particularly adapted to a system where the near-field communication is used to modify a configuration or a parameterizing of the equipment.

An embodiment provides an interface integrated circuit between a near-field communication environment and an equipment control wire environment.

In an embodiment, a system comprises: an electrically-controlled motor; a first circuit capable of receiving at least one control set point by near-field radio frequency communication; and a second circuit for generating one or a plurality of electric signals in pulse width modulation (PWM).

According to an embodiment, the set point(s) condition the duty cycle of the PWM signals.

According to an embodiment, the set point(s) condition the phase relationship of the PWM signals.

According to an embodiment, the motor is digitally controlled.

According to an embodiment, the motor is a stepping motor.

According to an embodiment, the motor is a servomotor.

According to an embodiment, the first circuit and the second circuit form part of a same circuit, further comprising a nonvolatile memory containing at least digital words for configuring the PWM signal(s), and a third circuit, different from the second circuit, for assigning the memory to the first circuit or to the second circuit.

According to an embodiment, the first circuit has access to the memory in write and in read mode, wherein the second circuit has access to the memory in read mode only.

According to an embodiment, the second circuit is in wired logic.

According to an embodiment, the third circuit is in wired logic.

According to an embodiment, the generation of the PWM signal is modified during a near field radio frequency communication.

According to an embodiment, the first circuit draws the power necessary for its operation from a radio frequency field.

According to an embodiment, the second circuit is exclusively powered by said device.

BRIEF DESCRIPTION OF THE DRAWINGS

The foregoing and other features and advantages will be discussed in detail in the following non-limiting description of specific embodiments in connection with the accompanying drawings, wherein:

FIGS. 5A, 5B, 5C, 5D, 5E, and 5F schematically illustrate with timing diagrams operating situations of the interface circuit;

FIGS. 6A, 6B, 6C, 6D, 6E, 6F, and 6G schematically illustrate in timing diagrams other operating situations of the interface circuit;

FIG. 10 schematically shows in the form of blocks a system implementing all or part of the described embodiments;

FIG. 10A illustrates a variation of the system of FIG. 10;

FIG. 11 schematically shows in the form of blocks another system implementing all or part of the described embodiments;

DETAILED DESCRIPTION

Figure 1:
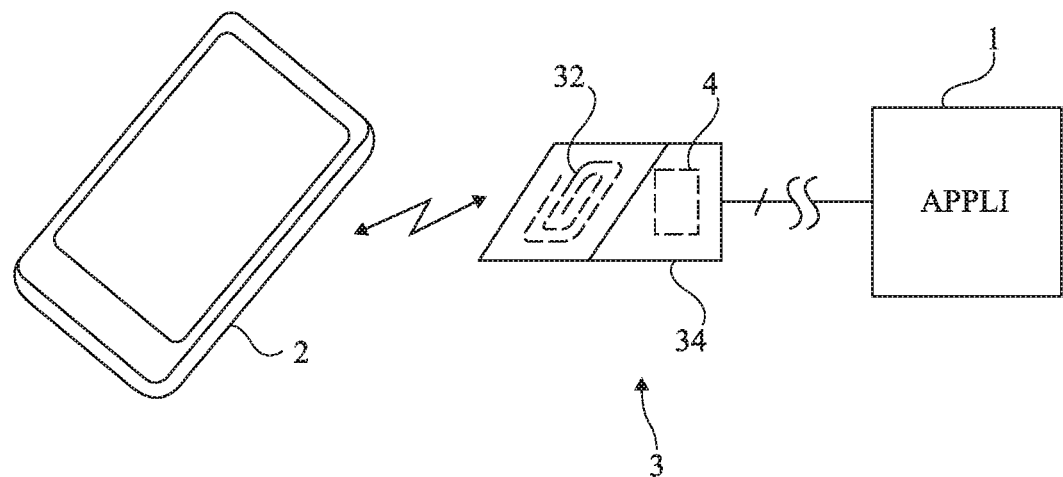
FIG. 1 is a simplified representation in the form of blocks of an example of a system of the type to which the embodiments which will be described apply as an example.

The same elements have been designated with the same reference numerals in the different drawings.

For clarity, only those steps and elements which are useful to the understanding of the embodiments which will be described have been shown and will be detailed. In particular, the generation of the radio frequency signals and the interpretation thereof have not been detailed, the described embodiments being compatible with usual techniques of generation and interpretation of these signals. Further, the interpretation of the control signals by the equipment has not been detailed either, the described embodiments here again being compatible with usual techniques.

Throughout the present disclosure, the term "connected" is used to designate a direct electrical connection between circuit elements, whereas the term "coupled" is used to designate an electrical connection between circuit elements that may be direct, or may be via one or more intermediate elements.

The terms "approximately", "about", and "in the order of" are used herein to designate a tolerance of plus or minus 10%, preferably of plus or minus 5%, of the value in question.

FIG. 1 is a simplified representation in the form of blocks of an embodiment of a system of the type to which embodiments which will be described apply as an example.

Such a system comprises: equipment 1 (APPLI) to be controlled or to be configured, depending on the application for which the system is intended; a device 2 equipped to transmit, in near field, control, configuration, or parameterizing data intended for equipment 1; and an interface 3 capable of converting the data received in near field from control device 2 into data capable of being interpreted by equipment 1 to be controlled.

Equipment 1 to be controlled is, for example, an illumination device or circuit (for example, comprising LEDs), an electric motor (for example, a linear motor or a stepping motor), a fluid circulation control valve, a servomotor, and more generally any equipment capable of being controlled, directly or indirectly, by an electric signal.

Control device 2 is, for example, a smart phone equipped with a NFC controller, a NFC reader dedicated to the application, and more generally any device (generally called reader or terminal) equipped with a circuit of generation and of modulation of a near field communication radio frequency field intended for an electronic tag, preferably a circuit compatible with standard ISO/IEC 15693, or with standard ISO/IEC 14443. Reference is made to the acronym NFC to designate near field communications, but this does not necessarily mean according to the NFC-Forum. Indeed, the described embodiments are more generally compatible with radio frequency communications, currently called RFID or NFC.

In the applications targeted by the present disclosure, interface 3 is configured to store control or configuration data sent to equipment 1 to be controlled, for example, on request, typically when the application equipment is powered on or turned on or initialized. Thus, interface 3 is equipped with a memory of non-volatile storage of control or configuration data intended for equipment 1.

An easy solution is to provide, in interface 3, an electronic tag formed of a NFC controller associated with a reprogrammable non-volatile memory for storing the control and configuration data, and a microcontroller or microprocessor generating electric signals for controlling equipment 1 based on data read from the memory of the electronic tag. However, such a solution is particularly expensive and requires for the micro controller to be programmed in order to manage communications with the electronic tag.

According to the described embodiments, it is provided to take advantage of the fact that, in the targeted systems, equipment 1 to be controlled does not need to communicate with control device 2, that is, to send data to device 2. Equipment 1 just extracts data of configuration and of control from interface 3. In other words, the communication is unidirectional from control device 2 to equipment 1 to be controlled.

Thus, interface 3 comprises an antenna 32 (in dotted lines in FIG. 1) and an integrated circuit 4 (also in dotted lines in FIG. 1) capable of communicating in near field with device 2 and of supplying the electric control signals to the application, and thus to equipment 1. In the example shown in FIG. 1, interface 3 is housed in a package 34, different from the device to be controlled. However, according to the application, interface 3 may be housed in a package or an enclosure of equipment 1 to be controlled.

A difficulty, however, is that interface 3 should exchange with control device 2, if only to be correctly identified by said device and confirm the correct reception of the received data. Further, interface 3 should be able to be triggered by equipment 1 to be controlled in order to supply the stored data. Now, the memory of storage of the control data cannot be accessed by device 2 and be read by equipment 1 at the same time.

Figure 2:
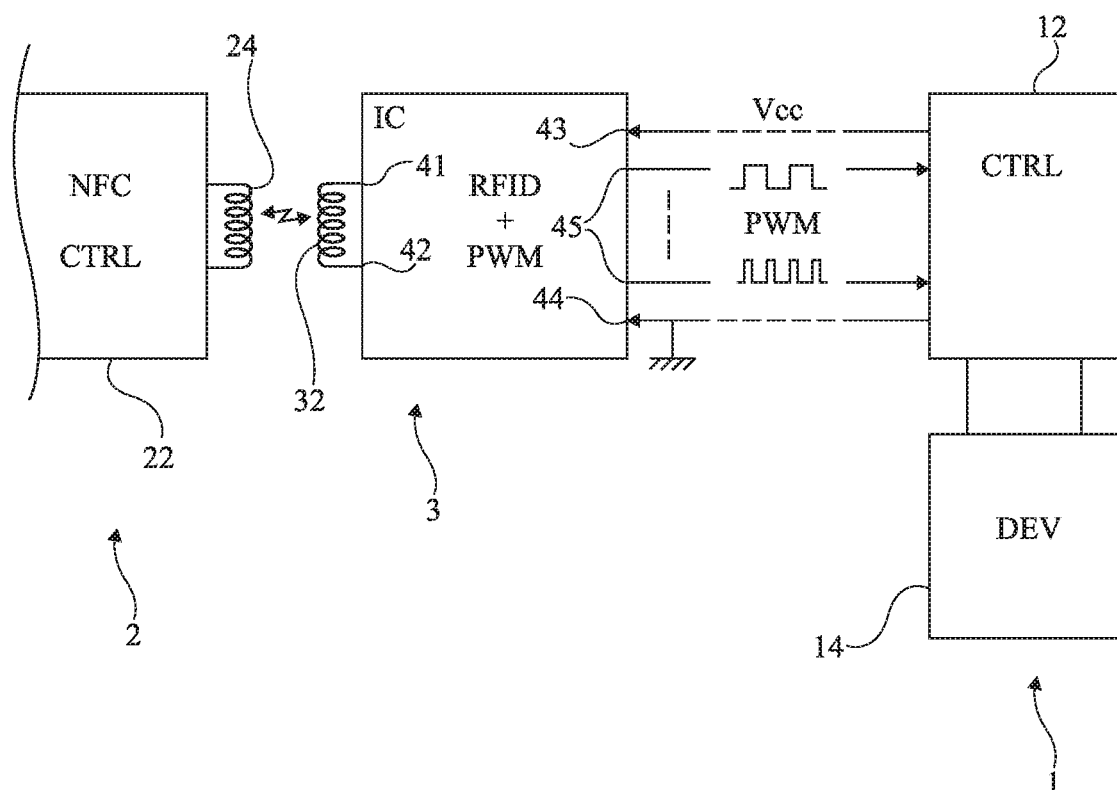
FIG. 2 is a simplified representation in the form of blocks of an embodiment of an interface circuit in its environment.

FIG. 2 is a simplified representation in the form of blocks of an embodiment of an interface in its environment.

According to this embodiment, integrated circuit 4 (IC, RFID+PWM), forming, with antenna 32, interface 3, comprises: two terminals 41 and 42 for connection to antenna 32; two terminals 43 and 44 configured to receive a DC power supply voltage Vcc, where one (44) of the two terminals defines a reference potential, typically, the ground; and at least one terminal 45 intended to supply a signal in pulse width modulation (PWM) to an electronic circuit 12 (CTRL) of equipment 1.

In the shown example, a plurality of terminals 45 supply device 1 with a plurality of pulse-width modulated signals. The number of signals depends on the application and different examples will be illustrated hereafter.

Circuit 12, included in equipment 1, has the function of interpreting the PWM signals received from integrated circuit 4 to control an electric device 14 (DEV) of the equipment (a lamp, a motor, etc.). Preferably, the DC voltage Vcc applied between terminals 43 and 44 is supplied by (or under control of) circuit 12. This enables, as will be seen hereafter, to trigger a reading of the data stored in integrated circuit 4 with no additional control signal. Generally, circuit 12 does not non-volatilely store the data that it receives from integrated circuit 4, but only comprises volatile storage circuits (for example, flip-flops or registers) and should thus receive, at each powering on or resetting, the PWM signal(s) generated by integrated circuit 4.

Figure 3:
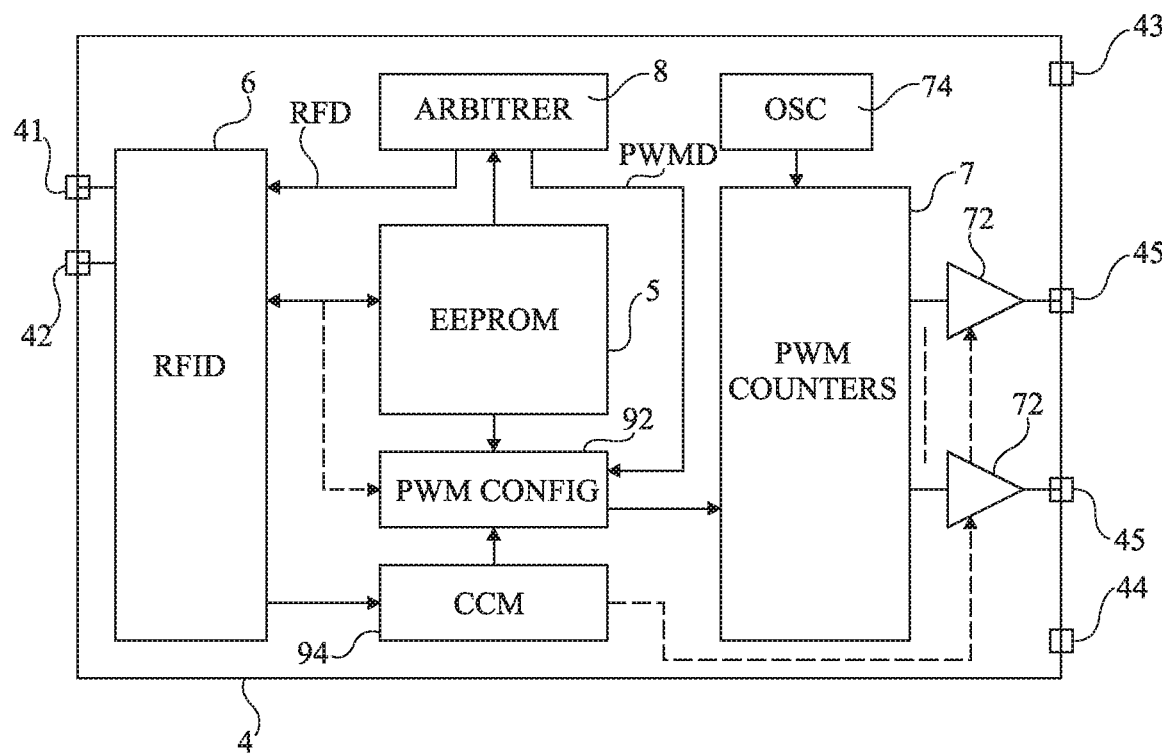
FIG. 3 schematically shows in the form of blocks an embodiment of an integrated interface circuit.

FIG. 3 schematically shows in the form of blocks an embodiment of an integrated interface integrated circuit 4, according to an aspect of the present disclosure.

The representation of FIG. 3 is functional. In practice, all the elements are made in integrated form in a same chip. Further, for simplification, the signals powering the different components of integrated circuit 4 are not illustrated in FIG. 3. The power supply signals are however discussed hereafter.

Integrated circuit 4 comprises at least: one reprogrammable non-volatile memory 5, for example, an EEPROM or a flash memory; one near-field radio frequency communication RFID circuit 6 (RFID); one logic configuring circuit 7 generating PWM signals from digital reference words contained in memory 5; one logic circuit 8 (ARBITER) for allocating memory 5 to one or the other of circuits 6 or 7; and one logic circuit 92 (PWM CONFIG) for configuring circuit 7.

Integrated circuit 4, shown in FIG. 3, also comprises, among others: one or a plurality of amplifiers 72 of the PWM signals generated by configuring circuit 7, the outputs of amplifiers 72 being coupled, preferably connected, to terminals 45; and an oscillator 74 (OSC) for generating a sequencing signal for configuring circuit 7.

In practice, configuring circuit 7 is formed of an assembly of counters, sequenced by oscillator 4 and controlled by logic circuit 92 based on words read by the latter from memory 5. The generation of PWM signals based on digital words for parameterizing these signals is usual per se.

RFID circuit 6 is coupled, preferably connected, to terminals 41 and 42. RFID circuit 6 forms the NFC interface of integrated circuit 4. RFID circuit 6 has, among others, the function of: detecting a radio frequency field where integrated circuit 4 is located; extracting from this field a voltage for powering at least memory 5, RFID circuit 6, and logic circuit 8 when no voltage is applied between terminals 43 and 45; demodulating data present on the radio frequency signal transmitted by device 2 (FIGS. 1 and 2) and sending back to device 2 data contained in the memory, such as for example the identifier of integrated circuit 4, or sending at least some of the data to memory 5 for their storage; and generating signals of retromodulation (preferably by passive load modulation) of the field where interface 3 is located.

The data stored in memory 5 are, among others: radio frequency configuration data and in particular an identifier of integrated circuit 4 to enable a reader to determine that it effectively communicates with the desired application; data relative to the coding of the PWM signal(s), among which the frequencies, the duty cycles, and the phase ratios of the PWM signals; and system or user data linked to the application.

Memory 5 is only read by logic circuit 92 each time integrated circuit 4 is booted, which is triggered by the presence of a DC power supply voltage originating from the application, and is not read between two of said boot or initialization operations. Memory 5 is read by RFID circuit 6, at each boot operation, be it caused by the presence of a DC voltage originating from the application or during an activation by the radio frequency field. In the presence of an activation by the radio frequency field, data of configuration of the radio frequency communication with RFID circuit 6 as well as, for example, the single identifier of integrated circuit 4, are extracted from memory 5. Memory 5 is only written into by RFID circuit 6.

According to the described embodiments, circuits 7, 8, and 92 are state machines in wired logic, that is, are not programmable (they contain no registers), but are formed of flip flops and of combinatory logic functions (OR, AND, etc.).

In the described embodiments, memory 5 is only read by the application at the booting of or on application of voltage Vcc to integrated circuit 4. Further, the memory is only programmed by RFID circuit 6.

According to a preferred embodiment, to authorize a modification of the PWM signals without requiring rebooting integrated circuit 4, logic circuit 92 receives (connection in dotted lines in FIG. 3) from RFID circuit 6 the words that the circuit writes into memory 5. Preferably, logic circuit 92 only modifies the PWM signals (configuring circuit 7) once the writing into memory 5 has ended to guarantee that the configuration (the PWM signals) is the same at the next reboot. As a variation, the PWM signals are modified in parallel with the writing into the memory for applications where it is accepted to return to the previous configuration in the case where the writing into memory 5 fails.

As previously mentioned, any conflict of access to memory 5 should be avoided. This function is ensured by logic circuit 8 which arbitrates accesses to the memory.

According to the described embodiments, such an arbitration is advantageously performed by detecting where the power first originates from and by giving priority to the corresponding side (RFID or PWM) of power origination.

This is a particularly simple solution since a plurality of situations are directly settled according to whether such or such circuit is powered or not.

Figure 4:
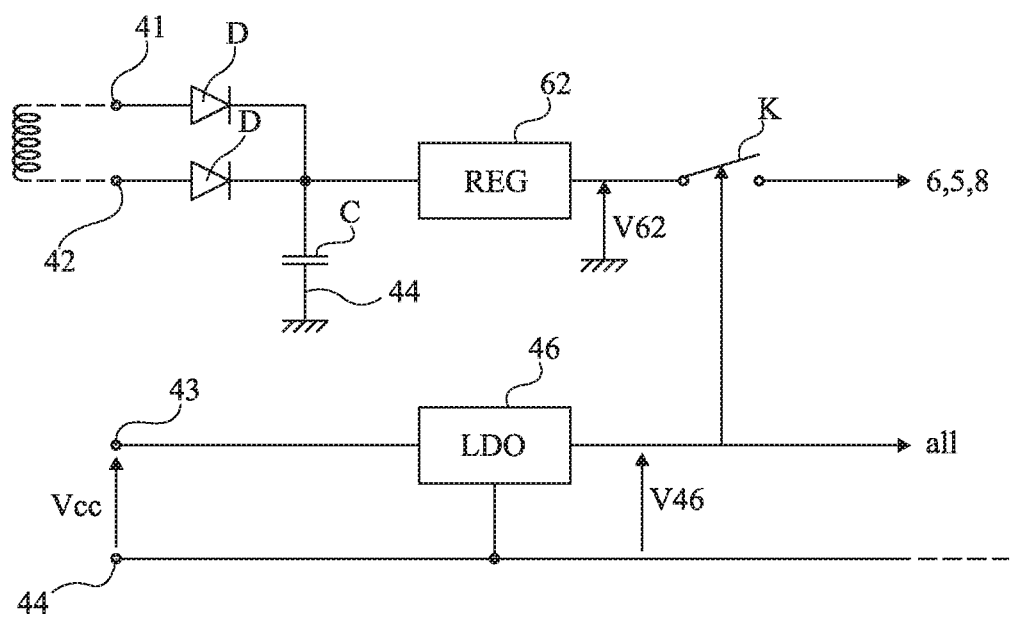
FIG. 4 schematically and functionally shows the power sources of the different components of the interface circuit.

FIG. 4 schematically and functionally shows the power sources of the different components of interface integrated circuit 4.

A power supply voltage may either originate from the electromagnetic field generated by the terminal (2, FIGS. 1 and 2), or from the application (1, FIG. 1).

Schematically, terminals 41 and 42 are coupled, by rectifying elements (diodes D), to a regulator 62 (REG) and a capacitive element C coupling the cathodes of the diodes to ground (terminal 44). Regulator 62 may be a simple limiter or a more advanced regulator. An output of regulator 62 thus provided power, in the presence of a radio frequency field, to the RFID circuit 6, memory 5, and logic circuit 8. The output of regulator 62 is controllable by a normally-on switch K. Switch K is driven (turned off) when a voltage Vcc is present between terminals 43 and 44. A linear regulator 46, for example, a low drop-out regulator (LDO), powers, in the presence of a voltage Vcc, all the components of integrated circuit 4 with a voltage V46 and turns off switch K.

Thus, it can already been seen that the generation of the PWM signals and the reading from the memory by logic circuit 92 can only occur when a voltage is present between terminals 43 and 44. Further, the generation of the PWM signals is only present while voltage Vcc is present.

However, on the side of RFID circuit 6, the latter is powered either by the field, or by voltage Vcc.

Accordingly, if integrated circuit 4 is booted (powered on) by the reception of a radio frequency signal, only RFID circuit 6 has access to the memory in read or in write mode. If the circuit is booted (powered on) by voltage Vcc, all circuits and components are powered. Accordingly, memory 5 is accessible by circuits 6 and 92 and an arbitration may be necessary, in particular if a radio frequency field also appears. However, memory 5 is preferably only read from by logic circuit 92 at the starting of a power supply by the application. Accordingly, although the PWM signals are permanently supplied to the application by configuring circuit 7 in the presence of voltage Vcc, they are only initialized by logic circuit 92 at the booting or on request of RFID circuit 6.

The operation of logic circuit 8 is functionally described hereafter based on timing diagrams illustrating different situations which are likely to occur.

FIGS. 5A, 5B, 5C, 5D, 5E, and 5F schematically illustrate with timing diagrams operating situations of interface integrated circuit 4.

The drawings particularly illustrate the operation of integrated circuit 4 at the booting in two non-conflicting cases according to which the booting is performed in the presence of voltage Vcc only (left-hand portion of the timing diagrams) and in the presence of voltage V62 (originating from the field) only (right hand portion of the timing diagrams).

FIG. 5A shows an example of shape of voltage V46 output by regulator 46. FIG. 5B shows an example of shape of voltage V62 output by regulator 62. FIG. 5C shows the state of a signal BD (Boot Done) indicative of a complete booting of integrated circuit 4 (including of circuits 6, 92, and 7). FIG. 5D shows the state of a signal BFD (Boot Field Done) indicative of a booting of RFID circuit 6 under the effect of voltage V46. FIG. 5E shows the periods of access to memory 5 (EE). FIG. 5F shows, in its left-hand portion, the state of a signal RFD (RF Disable) supplied by logic circuit 8 to RFID circuit 6, for deactivating the radio frequency functionality and, in its right-hand portion, the state of a signal PWMD (PWM Disable) supplied by RFID circuit 6 to logic circuit 92, for deactivating the functionality of reading the PWM data from the memory.

Logic circuit 8 is powered both by voltage V46 and by voltage V62, to be able to switch the states of signals BDF, BD, RFD, and PWMD in particular.

Boot means that the RFID circuit 6 or 92 which has access to memory 5 in read mode has finished its operations on the memory.

In the left-hand portion of the timing diagrams, it is assumed that voltage Vcc is present between terminals 43 and 44 from a time t10. At a subsequent time t11, regulator 46 has started and supplies a voltage sufficient to power the circuits. In this configuration, from time t11, the memory (signal EE) is read from (R) to extract the PWM signal configuration data. The binary words read from the memory by logic circuit 92 enable to parameterize the counters of configuring circuit 7 which will generate, with the clock signal of oscillator 74, the PWM signals intended for amplifiers 72. At a time t12 when the memory has been read and where the PWM signals are ready, it is considered that all circuits are ready (signal BD in the active state). To avoid a conflict of access to the memory while the latter is being read from by logic circuit 92, logic circuit 8 deactivates the radio frequency functions of integrated circuit 4 (signal RFD, FIG. 5F, in the high state) until time t12. Assuming that no reader has presented itself to interface 3, when the application is off and voltage Vcc disappears (time t13), regulator 46 is no longer powered and signals BD and BFD return to their inactive state at a subsequent time t14 from which regulator 46 can no longer hold the power supply voltage.

In the right-hand portion of the timing diagrams, it is assumed that voltage Vcc is not present between terminals 43 and 44, but that from a time t20, a radio frequency field is detected by antenna 32. At a subsequent time t21, voltage V62 (for example, regulated by regulator 62) is sufficient to power RFID circuit 6, memory 5, and logic circuit 8. In such a configuration, from time t21, the memory (signal EE) is read from (R) to extract the radio frequency configuration data. At a time t22 when the memory has been read, signal BFD indicative of a booting by the radio frequency voltage is activated. To avoid a conflict of access to memory 5 while the latter is being read from by RFID circuit 6, logic circuit 8 deactivates (or prevents the activation of) logic circuit 92 (signal PWMD, FIG. 5F, in the high state) until time t22. It is assumed that at a time t33, RFID circuit 6 receives a memory access request REQ (read or write mode) originating from device 2. At time t33, logic circuit 8 deactivates (or prevents the activation of) logic circuit 92 (signal PWMD in the high state) to avoid a conflict at the level of memory 5, and RFID circuit 6 can thus communicate with the memory. Once the access has ended (time t34), signal PWMD is switched to its idle state. It is assumed that the application does not initialize the circuit. Accordingly, at a time t24, subsequent to a time t23 when the field disappears, the power supply voltage of memory 5, of RFID circuit 6, and of logic circuit 8, disappears and signal BFD returns to the low state.

For simplification, time shifts due to signal propagations and to signals switching states have been neglected. In practice, it is ensured that there is no conflict, in particular at the level of the accesses to memory 5.

FIGS. 6A, 6B, 6C, 6D, 6E, 6F, and 6G schematically illustrate in timing diagrams other operating situations of interface integrated circuit 4.

These drawings particularly illustrate the operation of integrated circuit 4 in the presence of a power supply conflict, that is, if the application supplies a voltage Vcc while the circuit is powered by a field (left-hand portion of the timing diagrams) or if a reader attempts to program the memory while the circuit is powered by the application (right-hand portion of the timing diagrams). In the same way as for FIGS. 5A to 5F, the slight time shifts between signal switching state are neglected.

FIG. 6A shows an example of shape of voltage V46 (Vcc) supplied by regulator 46. FIG. 6B shows an example of shape of voltage V62 supplied by regulator 62. FIG. 6C shows the state of signal BD (Boot Done) indicative of a complete booting of integrated circuit 4 (including of circuits 6, 92, and 7). FIG. 6D shows the state of signal BFD (Boot Field Done) indicative of a booting of RFID circuit 6 under the effect of voltage V46. FIG. 6E shows the periods of access to memory 5 (EE). FIG. 6F shows the state of signal RFD (RF Disable), supplied by logic circuit 8 to RFID circuit 6, for deactivating the radio frequency functionality. FIG. 6G shows the state of signal PWMD of deactivation of logic circuit 92 for reading the PWM configuration from memory 5.

In the left-hand portion of the timing diagrams of FIGS. 6A to 6G, it is assumed that integrated circuit 4 is powered and has started under the effect of the radio frequency field and that the field is still present (state corresponding to that of the right-hand portion of FIGS. 5A to 5F between times t22 and t23). Thus, voltage V62 is present, signal BFD is active and signals BD, RFD, and PWMD are inactive. It is assumed that at time t30, the application supplies a voltage Vcc. As soon as regulator 46 supplies a voltage V46 having a sufficient level (time t31), switch K (FIG. 4) is turned off and the general powering of integrated circuit 4 is provided by voltage V46. It is assumed that the field remains present, so that voltage V62 is still present (illustrated in dotted lines in FIG. 6B) but is not used. At time t31, the radio frequency functionality is deactivated (signal RFD in the high state) so that RFID circuit 6 can no longer read from or write into memory 5. From time t31, logic circuit 92 reads the PWM configuration from memory 5 and configures configuring circuit 7. When this reading is ended and configuring circuit 7 is configured (time t32), signal BD switches to the active state and signal RFD is deactivated, to enable the reader to perform a programming if need be.

It is assumed that the field remains present (signal BFD remains active) and that at a time t33, RFID circuit 6 receives a request for writing into the memory originating from the reader. At time t33, logic circuit 8 deactivates logic circuit 92 to avoid a conflict at the level of memory 5 and RFID circuit 6 can thus communicate with the memory. Once the writing is ended (time t34), the new PWM parameters have to be applied to the application. To achieve this, the configuration parameters are preferably updated in logic circuit 92 directly by RFID circuit 6. Update MAJ92 (arrow in FIG. 6E) however only preferably intervenes at the end of a period of the PWM signals, not shown in FIGS. 6A to 6G.

According to a variation, not shown, logic circuit 8 deactivates the radio frequency functionality at time t34 and causes a new reading, from the memory, of the configuration parameters by logic circuit 92.

Signals BD and BFD are respectively switched to their inactive state, as discussed in relation with FIGS. 5A to 5F, when voltage Vcc or the field disappears, which is not the case in the left-hand portion of FIGS. 6A to 6G where it is considered that the field and voltage Vcc remain present.

In the right-hand portion of the timing diagrams of FIGS. 6A to 6G, it is assumed that integrated circuit 4 is powered by the application (voltage Vcc) but is not in a radio frequency field (state corresponding to that of the left-hand portion of FIGS. 5A to 5F between times t12 and t13). This also amounts to considering that, at the end of the left-hand portion of FIGS. 6A to 6G, the radio frequency field disappears but that voltage Vcc remains. Thus, voltage V46 is present, signal BD is active and signals BFD, RFD, and PWMD are inactive. It is assumed that at a time t40, a reader applies a radio frequency field to modify the configuration of the PWM signals. Since RFID circuit 6 is already initialized by the presence of voltage V46, the presence of the field directly triggers at time t40 the switching of signal BFD. As soon as the request is demodulated by RFID circuit 6 (time t41), logic circuit 8 deactivates logic circuit 92 (signal PWMD active) and gives access to the memory to RFID circuit 6. The operation of writing by RFID circuit 6 (times t41 to t42), and then of transfer (MAJ92) of the new parameters by RFID circuit 6 to logic circuit 92 to transfer them in PWM to the application is similar to that described in the left-hand portion of FIGS. 6A to 6G. In the right-hand portion of the timing diagrams of FIGS. 6A to 6G, it is then assumed that the field disappears at a time t44, causing the switching to the low state of the signal BFD at a time t45.

The forming of logic circuit 8 in the form of a state machine in wired logic is particularly simple. Indeed, the switchings are caused by the presence of voltages V62 and V46 as well as by the ends of cycles of memory 5. It is thus easy to implement the different functional situations discussed hereabove in relation with FIGS. 5A to 5F and 6A to 6G. An advantage of the described embodiments is that they enable to decrease the surface area occupied by the integrated circuit with respect to the surface area necessary with a microprocessor or microcontroller.

Another advantage is that the embodiment in the form of state machines in wired logic avoids risks of malfunctions due to program execution errors, as would be the case with a microprocessor or microcontroller.

The fact of integrating, in a same chip, the RFID and PWM functions risks, in certain cases, generating a disturbance of the radio frequency signals under the effect of the PWM signals. Indeed, the proximity of circuits 6 and 7 may result in that the PWM signals generate noise at the level of RFID circuit 6, which disturbs radio frequency transmissions-receptions.

Such a noise problem is not only present in an interface integrated circuit 4 such as described in relation with FIG. 3, but more generally in any system where digital pulse trains (PWM) are capable of disturbing radio frequency transmissions-receptions due to the proximity of the circuits generating such respective signals. This may be the case, for example, for a microcontroller generating PWM signals and assembled close to a NFC controller or router, or also for two integrated circuits respectively dedicated to a generation of PWM signals and of radio frequency near-field communication signals.

RFID signals which are located in a range of transmission carriers from 10 to 20 MHz, typically in the order of 13.56 MHz with modulation or retromodulation carriers of several hundreds of kHz, typically in the order of 847 kHz, in the order of 484 kHz or in the order of 423 kHz, are particularly sensitive to frequencies of several hundreds of kHz, generally used for PWM signals.

Thus, according to another aspect of the present disclosure, it is provided to intervene, during RFID transmissions, on the generation of the PWM signals to reduce their impact (the noise).

In an interface integrated circuit 4, such as described in FIG. 3, integrated circuit 4 comprises a noise suppression circuit 94 introducing at least one countermeasure to noise during radio frequency transmission-reception. Noise suppression circuit 94 receives from RFID circuit 6 information according to which a transmission is present and intervenes on one or a plurality of circuits, among logic circuit 92, configuring circuit 7, or amplifiers 72. The countermeasure(s) are applied as soon as a request is received from a reader and until the transmission is ended. This may correspond to the end of a response by integrated circuit 4 to device 2 or at the end of a request received from device 2 if the latter calls for no response. A RFID circuit is capable of determining, on reception of a request, if the latter calls for a response or not and can thus trigger noise suppression circuit 94 and stop it once the radio frequency transmission is ended.

More generally, according to this other aspect, a circuit introducing one or a plurality of countermeasures to noise is provided, in the circuit generating PWM pulses or in a neighboring circuit.

An example applied to integrated circuit 4 is described hereafter, but all that is described can be easily transposed to other circuits where similar problems are posed. In particular, the case of the generation of a single PWM signal is considered but all that is described applies whatever the number of generated PWM signals.

For example, the possibility of selecting one or a plurality of countermeasures which are integrated in the circuit is provided in integrated circuit 4. Such a selection depends on the application and is determined, for example, in a phase of personalization of integrated circuit 4.

Figure 7A:
FIGS. 7A and 7B schematically illustrate in timing diagrams an embodiment of a noise reduction method.
Figure 7B:

FIGS. 7A and 7B schematically illustrate in timing diagrams an embodiment of a noise reduction method.

FIG. 7A illustrates the presence of a radio frequency communication COM. FIG. 7B illustrates an example of PWM signal.

According to this embodiment, it is provided to interrupt the PWM signals during radio frequency transmission periods. Thus, between times t51 and t52, there is no transmission of PWM signals to the application using these signals. Such an interruption suppresses the switching noise of the PWM amplifier and thus any disturbance of the radio frequency signals. The interruption of any PWM signal generally does not adversely affect the operation of the application since a RFID communication generally lasts for less than a few milliseconds.

To interrupt the PWM signals, terminals 45 may be set to high impedance (outputs of amplifiers 72) during the transmission. Such an implementation requires a connection (in dotted lines in FIG. 3) of noise suppression circuit 94 to amplifiers 72 to set their outputs to high impedance.

As a variation, noise suppression circuit 94 intervenes on configuring circuit 7 to place the inputs that it receives from logic circuit 92 in a steady state interrupting the generation of PWM signals. Such a variation is possible since logic circuit 92, if it only reads memory 5 at the booting, volatilely stores the parameter in flip-flops and permanently sends them to configuring circuit 7.

Figure 8A:
FIGS. 8A, 8B, and 8C schematically illustrate in timing diagrams another implementation mode of a noise reduction method.
Figure 8B:
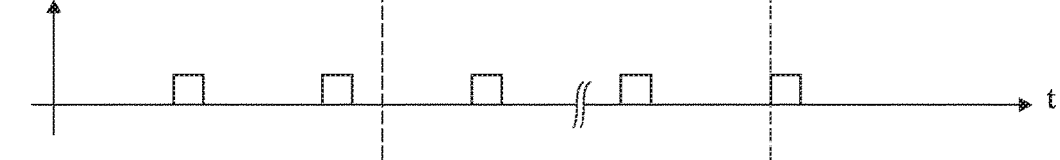
Figure 8C:

FIGS. 8A, 8B, and 8C schematically illustrate in timing diagrams another embodiment of a noise reduction method.

FIG. 8A illustrates the presence of a radio frequency communication COM. FIG. 8B illustrates an example of PWM signal. FIG. 8C illustrates output level L of amplifier 72.

According to this embodiment, the number of output stages used per amplifier 72 is decreased to increase the impedance of terminals 45 and decrease the level of the switching noise. In a way, a variation of the power of the PWM signals is performed according to whether one is or not in the presence of a radio frequency transmission. Advantage is here taken from the fact that output amplifiers 72 are generally provided with a plurality of output stages in parallel to be capable of outputting the signals with the required intensities.

Such an embodiment is compatible with applications where the PWM signals are not desired to be totally interrupted.

Figure 9A:
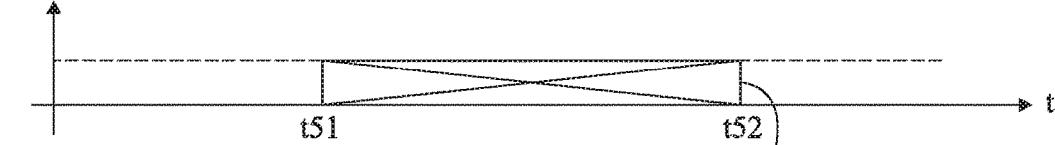
FIGS. 9A and 9B schematically illustrate in timing diagrams still another embodiment of a noise reduction method.
Figure 9B:
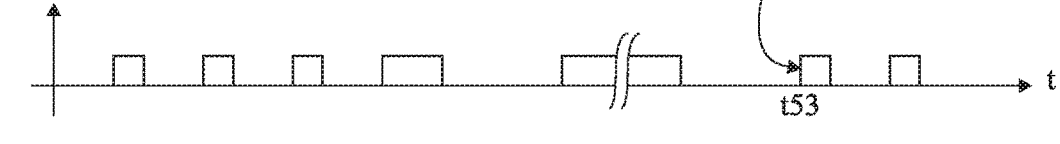

FIGS. 9A and 9B schematically illustrate in timing diagrams still another embodiment of a noise reduction method.

FIG. 9A illustrates the presence of a radio frequency communication COM. FIG. 9B illustrates an example of PWM signal.

According to this embodiment, it is provided to decrease, during radio frequency communications, the frequency of the PWM signals, while keeping their duty cycle (or their phase relationship). Such a frequency decrease enables to decrease the occurrences of communication noise and thus decreases the disturbances of radio frequency signals. As a specific embodiment, for PWM signals at normal frequencies of several tens of kHz, one may, between times t51 and t52, decrease the frequency to a few kHz.

According to still another embodiment, it is provided to combine a power decrease (FIGS. 8A to 8C) and a frequency decrease (FIGS. 9A and 9B).

The operation becomes normal again as soon as the radio frequency transmission is ended. However, in the case of a frequency decrease, it will be ascertained to preserve the duty cycle when the frequency is increased back. Thus, the time (t53) from which the frequency becomes normal again may be subsequent to end-of-communication time t52.

All or part of the countermeasures to noise may be provided in integrated circuit 4.

According to another aspect of the present disclosure, a power dimming system for varying the power of an electric load by electric pulse-width modulated signals (PWM), with a near field radio frequency control (RFID), is provided. Thus, a system comprising a RFID or NFC to PWM interface is provided, such a system also comprising a near-field communication control device and PWM electric control equipment. Preferably, the interface is unidirectional, that is, it is intended for applications where the equipment does not need to communicate, at least via the interface, with the control device.

Examples where the practical implementation is performed by an interface 3 such as previously described are described hereafter. However, the described embodiments can be easily transposed to other practical embodiments respecting the described functionalities.

FIG. 10 schematically shows in the form of blocks a power dimming system for varying the power of an electric load formed of an illumination circuit.

According to this embodiment, interface 3 is applied to the control of a light signal comprising one or a plurality of lamps 142 (for example, based on light-emitting diodes, or LEDs) to provide a dimmer function. In the example of FIG. 10, lamp 142 is capable of directly receiving a turn on/off and light intensity order in the form of a pulse-width modulated PWM signal. Lamp block 142 (for example, the diode control circuit or driver) is then coupled, preferably connected, to an output 45 of integrated circuit 4. Voltage Vcc enabling to power the reading from memory 5 and the generation of the PWM signal is, for example, supplied by lamp block 142. A plurality of PWM outputs 45 of integrated circuit 4 may be used to control a plurality of lamp blocks 142.

As compared with a solution with a resistive dimmer, the solution provided herein provides a better accuracy. As compared with a solution with a microcontroller, an advantage of the provided solution is a lower cost without losing accuracy and a lower power consumption. Further, the provided PWM signal solution is compatible with turn-on functions in all or nothing (1 or 0).

FIG. 10A partially shows a variation according to which lamp block 142' needs an analog light intensity control signal VANALOG. It is then provided to interpose a low-pass filter 143 (RC FILTER), for example, a resistive and capacitive cell, to convert the PWM digital signal into an analog level.

FIG. 11 schematically shows in the form of blocks another system for varying the power of an electric load formed of a DC electric motor.

According to this embodiment, interface 3 is applied to the control of a motor 144, for example, a DC drive motor Vengine such as shown or a direct PWM drive motor. Amplifiers 145 (buffers) also powered with voltage Vcc, then supplied at terminal 43 of integrated circuit 4, may be interposed (according to the current required for the motor).

An advantage of this solution is a great accuracy of control of the motor speed, compatible with a near field communication control. As compared with a resistive solution, accuracy is gained and, as compared with a solution comprising a microcontroller, cost and power are saved.

According to other embodiments of power variation by RFID control of electric signals in PWM mode (not shown), the PWM signal controls a sound volume variation, a programmed input/output controller, and more generally any equipment adapted to an electric control in power variation.

According to another aspect of the present disclosure, a system of control, with near field radio frequency signals (RFID), of a driver (servomotor), or an electrically-controlled stepping motor, is provided. Thus, a system comprising a RFID or NFC to PWM interface is provided, such a system also comprising a near-field communication control device and PWM electric control equipment. In the same way as for power variation embodiments, such an interface is preferably unidirectional, that is, it is intended for applications where the equipment does not need to communicate, at least via the interface, with the control device.

As for the previous aspect, examples according to which the practical implementation is performed by an interface 3 such as previously described are described hereafter. However, the described embodiments can be easily transposed to other practical embodiments respecting the described functionalities.

Figure 12:
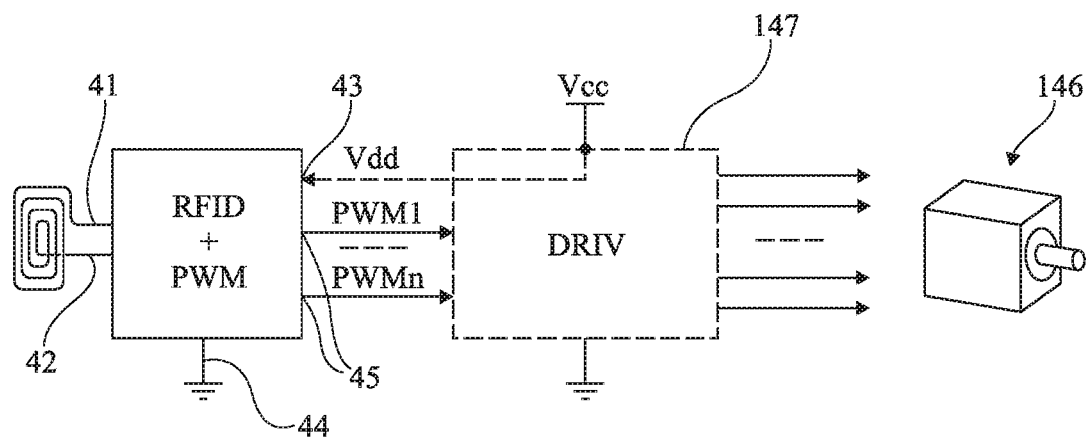
FIG. 12 schematically shows in the form of blocks still another system implementing all or part of the described embodiments.

FIG. 12 schematically shows in the form of blocks a system for controlling a stepping motor with PWM signals.

According to this embodiment, interface 3 is applied to the control of a stepping motor 146. In this case, a plurality of PWM outputs 45 of integrated circuit 4 are used and the generated PWM signals are also provided for a phase control. The number of PWM signals used depends on the application and the control signals required by stepping motor 146. Preferably, an amplification circuit 147 (DRIV) is interposed between integrated circuit 4 and motor 146.

An advantage of this solution is, in addition to all or part of the advantages described in relation with the other applications, a low-cost control with a high accuracy.

Figure 13:
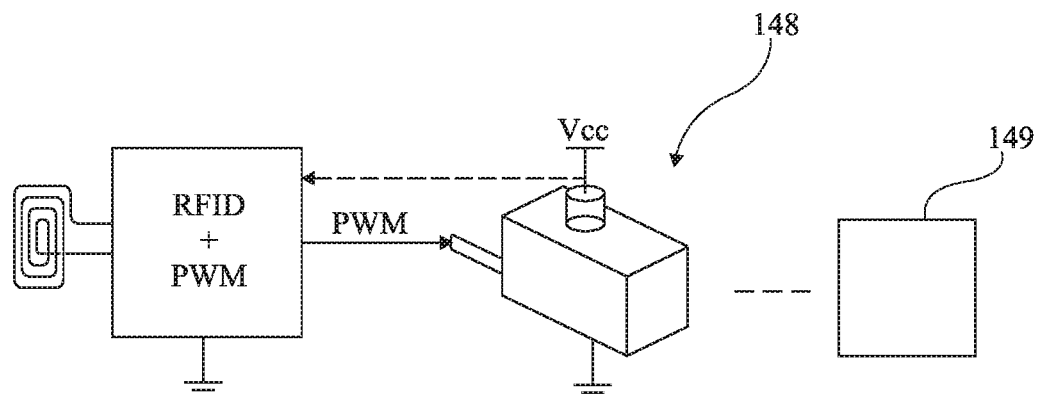
FIG. 13 schematically shows in the form of blocks still another system implementing all or part of the described embodiments.

FIG. 13 schematically shows in the form of blocks still another system of control by PWM signals of an electric actuator of servomotor type.

According to this embodiment, interface 3 is applied to the control of a mechanical object 149 by a servomotor 148. The mechanical position of the servomotor depends on the duty cycle of the PWM signal. Advantage is here taken from the fact of being able to perform, with an NFC interface, a direct, accurate, and low-cost control. The controlled object 149 may be a valve, a lock, and more generally any objet usually controllable with a servomotor.

Various embodiments have been described. Various alterations, modifications, and improvements will readily occur to those skilled in the art. In particular, the selection of the frequency of the pulse-width modulation signals may be different from one application to another. Further, although, a preferred embodiment provides the generation of the PWM signals (configuring circuit 7 supplies the PWM signals) all along the time during which the circuit is powered (except for some of the described counter measures to noise), it may be provided for the generation of the PWM signals to only occur at the booting. Further, although configuring circuit 7 and 92 have been described as being two different circuits, they may be one and the same circuit. Finally, the practical implementation of the embodiments which have been described is within the abilities of those skilled in the art based on the functional indications given hereabove.

The invention claimed is:

1. A circuit for controlling an electrically-controlled motor in response to a near-field radio frequency communication in a radio frequency band, comprising:
   a first circuit configured to receive at least one control set point through the near-field radio frequency communication; and
   a second circuit configured to generate a pulse width modulation (PWM) control signal in accordance with said at least one control set point for application to said electrically-controlled motor;
   wherein the second circuit is further configured, during a time period within which the near-field radio frequency communication is occurring, to modify generation of said PWM control signal so that it does not contribute interfering noise in said radio frequency band; and
   wherein the modification for the generation of said PWM control signal during said time period is to temporarily change a PWM frequency of the PWM control signal output to said electrically-controlled motor from a first frequency to a second frequency.

2. A circuit for controlling an electrically-controlled motor in response to a near-field radio frequency communication in a radio frequency band, comprising:
   a first circuit configured to receive at least one control set point through the near-field radio frequency communication; and
   a second circuit configured to generate a pulse width modulation (PWM) control signal in accordance with said at least one control set point for application to said electrically-controlled motor;
   wherein the second circuit is further configured, during a time period within which the near-field radio frequency communication is occurring, to modify generation of said PWM control signal so that it does not contribute interfering noise in said radio frequency band;
   wherein the modification for the generation of said PWM control signal during said time period is to temporarily terminate output of the PWM control signal to said electrically-controlled motor.

3. The circuit of claim 2, wherein the second circuit further comprises a driver circuit configured to output the PWM control signal, and wherein said driver circuit is placed in a tristate condition during said time period.

4. The circuit of claim 2, where the second circuit is further configured, at or after completion of the time period within which the near-field radio frequency communication is occurring, to again output of the PWM control signal to said electrically-controlled motor.

5. The circuit of claim 1, wherein the first circuit is powered for operation from a radio frequency field of said near-field radio frequency communication.

6. The circuit of claim 1, wherein said electrically-controlled motor is powered from a power supply voltage and wherein the second circuit is exclusively powered from the power supply voltage of the electrically-controlled motor.

7. The circuit of claim 6, wherein the second circuit is implemented in wired logic.

8. The circuit of claim 1, further comprising said electrically-controlled motor.

9. The circuit of claim 8, wherein the electrically-controlled motor is digitally controlled.

10. The circuit of claim 8, wherein the electrically-controlled motor is one of a stepping motor or a servomotor.

11. A circuit for controlling an electrically-controlled motor in response to a near-field radio frequency communication in a radio frequency band, comprising:
    a first circuit configured to receive at least one control set point through the near-field radio frequency communication; and
    a second circuit configured to generate a pulse width modulation (PWM) control signal in accordance with said at least one control set point for application to said electrically-controlled motor;
    wherein the second circuit is further configured, during a time period within which the near-field radio frequency communication is occurring, to modify generation of said PWM control signal so that it does not contribute interfering noise in said radio frequency band;
    wherein the modification for the generation of said PWM control signal during said time period is to temporarily change the PWM control signal output to said electrically-controlled motor from a first frequency to a second frequency; and
    wherein the at least one control set point conditions a duty cycle of the PWM control signal, and wherein that duty cycle is maintained during said time period when the frequency of the PWM control signal is temporarily changed.

12. The circuit of claim 11, wherein the first circuit is powered for operation from a radio frequency field of said near-field radio frequency communication.

13. The circuit of claim 11, wherein said electrically-controlled motor is powered from a power supply voltage and wherein the second circuit is exclusively powered from the power supply voltage of the electrically-controlled motor.

14. The circuit of claim 13, wherein the second circuit is implemented in wired logic.

15. The circuit of claim 11, further comprising said electrically-controlled motor.

16. The circuit of claim 15, wherein the electrically-controlled motor is digitally controlled.

17. The circuit of claim 15, wherein the electrically-controlled motor is one of a stepping motor or a servomotor.

18. A circuit for controlling an electrically-controlled motor in response to a near-field radio frequency communication in a radio frequency band, comprising:
   a first circuit configured to receive at least one control set point through the near-field radio frequency communication; and
   a second circuit configured to generate a pulse width modulation (PWM) control signal in accordance with said at least one control set point for application to said electrically-controlled motor;
   wherein the second circuit is further configured, during a time period within which the near-field radio frequency communication is occurring, to modify generation of said PWM control signal so that it does not contribute interfering noise in said radio frequency band;
   wherein the modification for the generation of said PWM control signal during said time period is to temporarily change the PWM control signal output to said electrically-controlled motor from a first frequency to a second frequency; and
   wherein the second circuit is further configured, at or after completion of the time period within which the near-field radio frequency communication is occurring, to return output of the PWM control signal to said electrically-controlled motor to the first frequency.

19. The circuit of claim 18, wherein the first circuit is powered for operation from a radio frequency field of said near-field radio frequency communication.

20. The circuit of claim 18, wherein said electrically-controlled motor is powered from a power supply voltage and wherein the second circuit is exclusively powered from the power supply voltage of the electrically-controlled motor.

21. The circuit of claim 20, wherein the second circuit is implemented in wired logic.

22. The circuit of claim 18, further comprising said electrically-controlled motor.

23. The circuit of claim 22, wherein the electrically-controlled motor is digitally controlled.

24. The circuit of claim 22, wherein the electrically-controlled motor is one of a stepping motor or a servomotor.

25. A circuit for controlling an electrically-controlled motor in response to a near-field radio frequency communication in a radio frequency band, comprising:
   a first circuit configured to receive at least one control set point through the near-field radio frequency communication; and
   a second circuit configured to generate a pulse width modulation (PWM) control signal in accordance with said at least one control set point for application to said electrically-controlled motor;
   wherein the second circuit is further configured, during a time period within which the near-field radio frequency communication is occurring, to modify generation of said PWM control signal so that it does not contribute interfering noise in said radio frequency band; and
   wherein the modification for the generation of said PWM control signal during said time period is to temporarily decrease the PWM control signal output to said electrically-controlled motor from a first amplitude to a second amplitude.

26. The circuit of claim 25, where the second circuit is further configured, at or after completion of the time period within which the near-field radio frequency communication is occurring, to return output of the PWM control signal to said electrically-controlled motor to the first amplitude.

27. The circuit of claim 25, wherein the first circuit is powered for operation from a radio frequency field of said near-field radio frequency communication.

28. The circuit of claim 25, wherein said electrically-controlled motor is powered from a power supply voltage and wherein the second circuit is exclusively powered from the power supply voltage of the electrically-controlled motor.

29. The circuit of claim 28, wherein the second circuit is implemented in wired logic.

30. The circuit of claim 25, further comprising said electrically-controlled motor.

31. The circuit of claim 30, wherein the electrically-controlled motor is digitally controlled.

32. The circuit of claim 30, wherein the electrically-controlled motor is one of a stepping motor or a servomotor.

33. A circuit for controlling an electrically-controlled device using a radio frequency communication control signal transmitted in a radio frequency band, comprising:
   a first circuit configured to receive at least one control set point through the radio frequency communication; and
   a second circuit configured to generate a pulse width modulation (PWM) control signal in accordance with said at least one control set point for application to said electrically-controlled device;
   wherein the second circuit is further configured, during a time period within which the radio frequency communication control signal is being transmitted, to temporarily terminate output of the PWM control signal to said electrically-controlled device so as to at least reduce interference in said radio frequency band.

34. The circuit of claim 33, wherein the second circuit further comprises a driver circuit configured to output the PWM control signal, and wherein said driver circuit is placed in a tristate condition during said time period.

35. The circuit of claim 33, wherein the first circuit is powered for operation from a radio frequency field of said near-field radio frequency communication.

36. The circuit of claim 33, wherein said electrically-controlled device is powered from a power supply voltage and wherein the second circuit is exclusively powered from the power supply voltage of the electrically-controlled device.

37. The circuit of claim 33, further comprising said electrically-controlled device.

38. The circuit of claim 37, wherein the electrically-controlled device is digitally controlled.

39. The circuit of claim 37, wherein the electrically-controlled device is a stepping motor.

40. The circuit of claim 37, wherein the electrically-controlled device is a servomotor.

41. The circuit of claim 37, wherein said electrically-controlled device is selected from the group consisting of: an illumination device, and a valve.

42. A circuit for controlling an electrically-controlled device using a radio frequency communication control signal transmitted in a radio frequency band, comprising:
   a first circuit configured to receive at least one control set point through the radio frequency communication; and
   a second circuit configured to generate a pulse width modulation (PWM) control signal in accordance with said at least one control set point for application to said electrically-controlled device;
   wherein the second circuit is further configured, during a time period within which the radio frequency communication control signal is being transmitted, to temporarily change a PWM frequency of the PWM control signal output to said electrically-controlled device so as to at least reduce interference in said radio frequency band.

43. The circuit of claim 42, wherein the at least one control set point conditions a duty cycle of the PWM control signal, and wherein that duty cycle is maintained during said time period when the signal frequency of the PWM control signal is temporarily changed.

44. The circuit of claim 42, wherein the first circuit is powered for operation from a radio frequency field of said near-field radio frequency communication.

45. The circuit of claim 42, wherein said electrically-controlled device is powered from a power supply voltage and wherein the second circuit is exclusively powered from the power supply voltage of the electrically-controlled device.

46. The circuit of claim 42, further comprising said electrically-controlled device.

47. The circuit of claim 42, where the second circuit is further configured, at or after completion of the time period within which the near-field radio frequency communication is occurring, to return output of the PWM control signal to the first frequency.

48. The circuit of claim 46, wherein the electrically-controlled device is digitally controlled.

49. The circuit of claim 46, wherein the electrically-controlled device is a stepping motor.

50. The circuit of claim 46, wherein the electrically-controlled device is a servomotor.

51. The circuit of claim 46, wherein said electrically-controlled device is selected from the group consisting of: an illumination device, and a valve.

52. A circuit for controlling an electrically-controlled device using a radio frequency communication control signal transmitted in a radio frequency band, comprising:
   a first circuit configured to receive at least one control set point through the radio frequency communication; and
   a second circuit configured to generate a pulse width modulation (PWM) control signal in accordance with said at least one control set point for application to said electrically-controlled device;
   wherein the second circuit is further configured, during a time period within which the radio frequency communication control signal is being transmitted, to temporarily decrease an amplitude of the PWM control signal output to said electrically-controlled device so as to at least reduce interference in said radio frequency band.

53. The circuit of claim 52, wherein the first circuit is powered for operation from a radio frequency field of said near-field radio frequency communication.

54. The circuit of claim 52, wherein said electrically-controlled device is powered from a power supply voltage and wherein the second circuit is exclusively powered from the power supply voltage of the electrically-controlled device.

55. The circuit of claim 52, further comprising said electrically-controlled device.

56. The circuit of claim 55, wherein the electrically-controlled device is digitally controlled.

57. The circuit of claim 55, wherein the electrically-controlled device is a stepping motor.

58. The circuit of claim 55, wherein the electrically-controlled device is a servomotor.

59. The circuit of claim 55, wherein said electrically-controlled device is selected from the group consisting of: an illumination device, and a valve.

* * * * *